US008976300B2

(12) United States Patent
Zhu

(10) Patent No.: US 8,976,300 B2
(45) Date of Patent: Mar. 10, 2015

(54) DISPLAY CONTROL APPARATUS, IMAGE DISPLAY SYSTEM, DISPLAY CONTROL METHOD, AND COMPUTER-READABLE RECORDING MEDIUM WHICH DISPLAYS A CAPTURED IMAGE WITH AN OVERLAID INPUT IMAGE WHEN A VIDEO SIGNAL IS NOT INPUT

(71) Applicant: Kuangyi Zhu, Kanagawa (JP)

(72) Inventor: Kuangyi Zhu, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 14/360,467

(22) PCT Filed: Nov. 21, 2012

(86) PCT No.: PCT/JP2012/080797
§ 371 (c)(1),
(2) Date: May 23, 2014

(87) PCT Pub. No.: WO2013/077456
PCT Pub. Date: May 30, 2013

(65) Prior Publication Data
US 2014/0307174 A1 Oct. 16, 2014

(30) Foreign Application Priority Data
Nov. 25, 2011 (JP) ................................. 2011-257872

(51) Int. Cl.
*H04N 5/268* (2006.01)
*H04N 5/445* (2011.01)
(Continued)

(52) U.S. Cl.
CPC *H04N 5/445* (2013.01); *B43L 1/00* (2013.01); *G06F 3/14* (2013.01); *H04N 5/268* (2013.01);
(Continued)

(58) Field of Classification Search
USPC ................. 348/706, 705, 552, 731, 558, 564; 710/16–18; 345/1.1, 173
See application file for complete search history.

(56) References Cited

U.S. PATENT DOCUMENTS 5,894,306 A * 4/1999 Ichimura ........................ 345/418
5,933,192 A * 8/1999 Crosby et al. ............ 375/240.25
(Continued)

FOREIGN PATENT DOCUMENTS

JP 2002-366343 12/2002
JP 2003-087247 3/2003
(Continued)

OTHER PUBLICATIONS
International Search Report issued on Mar. 5, 2013 in PCT/JP2012/080797 filed on Nov. 21, 2012.
(Continued)

Primary Examiner — Victor Kostak
(74) Attorney, Agent, or Firm — Oblon, McClelland, Maier & Neustadt, L.L.P.

(57) ABSTRACT

A display control apparatus receives an input of a video signal from an input device and makes a control that causes a video to be displayed on a display apparatus. The display control apparatus includes a capturing unit (410) configured to capture image data that represents a frame image of the input video signal; a signal detector (420) configured to detect whether the video signal is input and issue an instruction to cause the display apparatus to display the video or the frame image on the basis of a result of the detection; and a control unit (400, 430, 440, 450, 460) configured to generate the frame image from the image data captured most recently to cause the display apparatus to display the generated frame image when it is detected that the video signal is not input and the control unit receives the instruction to cause the display apparatus to display the frame image.

8 Claims, 16 Drawing Sheets

(51) Int. Cl.

| | | |
|---|---|---|
| *G06F 3/01* | (2006.01) | |
| *B43L 1/00* | (2006.01) | |
| *G06F 3/14* | (2006.01) | |
| *H04N 21/41* | (2011.01) | |
| *H04N 21/431* | (2011.01) | |
| *H04N 21/442* | (2011.01) | |
| *H04N 21/443* | (2011.01) | |
| *H04N 21/81* | (2011.01) | |
| *G09G 5/377* | (2006.01) | |
| *G09G 5/00* | (2006.01) | |

(52) U.S. Cl.
CPC ....... *H04N 21/4122* (2013.01); *H04N 21/4312* (2013.01); *H04N 21/44231* (2013.01); *H04N 21/443* (2013.01); *H04N 21/8193* (2013.01); *G09G 5/377* (2013.01); *G09G 5/003* (2013.01); *G09G 2340/12* (2013.01); *G09G 2370/20* (2013.01); *G09G 2370/22* (2013.01)
USPC .......................... 348/705; 348/564; 345/173

(56) References Cited

U.S. PATENT DOCUMENTS

| | | | | |
|---|---|---|---|---|
| 6,115,080 | A * | 9/2000 | Reitmeier | 348/731 |
| 6,118,498 | A * | 9/2000 | Reitmeier | 348/725 |
| 6,714,264 | B1 * | 3/2004 | Kempisty | 348/732 |
| 7,299,405 | B1 * | 11/2007 | Lee et al. | 715/700 |
| 7,671,927 | B2 * | 3/2010 | Kim | 348/731 |
| 8,228,441 | B2 * | 7/2012 | Lee et al. | 348/731 |
| 2002/0087973 | A1 * | 7/2002 | Hamilton et al. | 725/32 |
| 2002/0095534 | A1 * | 7/2002 | Bae | 710/16 |
| 2002/0144262 | A1 * | 10/2002 | Plotnick et al. | 725/32 |
| 2003/0234776 | A1 * | 12/2003 | Konishi | 345/204 |
| 2004/0098741 | A1 * | 5/2004 | Hara | 725/37 |
| 2004/0189879 | A1 * | 9/2004 | Read | 348/731 |
| 2004/0194134 | A1 * | 9/2004 | Gunatilake et al. | 725/38 |
| 2005/0044167 | A1 | 2/2005 | Kobayashi et al. | |
| 2005/0081244 | A1 * | 4/2005 | Barrett et al. | 725/97 |
| 2005/0094733 | A1 * | 5/2005 | Daniell | 375/240.25 |
| 2005/0207449 | A1 * | 9/2005 | Zhang et al. | 370/486 |
| 2007/0241990 | A1 * | 10/2007 | Smith et al. | 345/5 |
| 2008/0243494 | A1 * | 10/2008 | Okamoto et al. | 704/214 |
| 2009/0016445 | A1 * | 1/2009 | Gao et al. | 375/240.25 |
| 2009/0021641 | A1 * | 1/2009 | Matsuura et al. | 348/553 |
| 2010/0201890 | A1 * | 8/2010 | DeGonde et al. | 348/731 |
| 2011/0175929 | A1 | 7/2011 | Tanaka | |

FOREIGN PATENT DOCUMENTS

| | | |
|---|---|---|
| JP | 2009-251262 | 10/2009 |
| JP | 2011-145995 | 7/2011 |
| JP | 2012-168450 | 9/2012 |
| WO | WO 99/63753 | 12/1999 |
| WO | WO 2011/109578 A1 | 9/2011 |

OTHER PUBLICATIONS

Office Action issued Nov. 3, 2014 in European Patent Application No. 12850924.7-1904.

* cited by examiner

FIG.6

| PORT NUMBER | CONNECTION STATUS | TIME STAMP |
|---|---|---|
| 1 | ON | 09:30:15.12 |
| 2 | OFF | 09:20:15.12 |

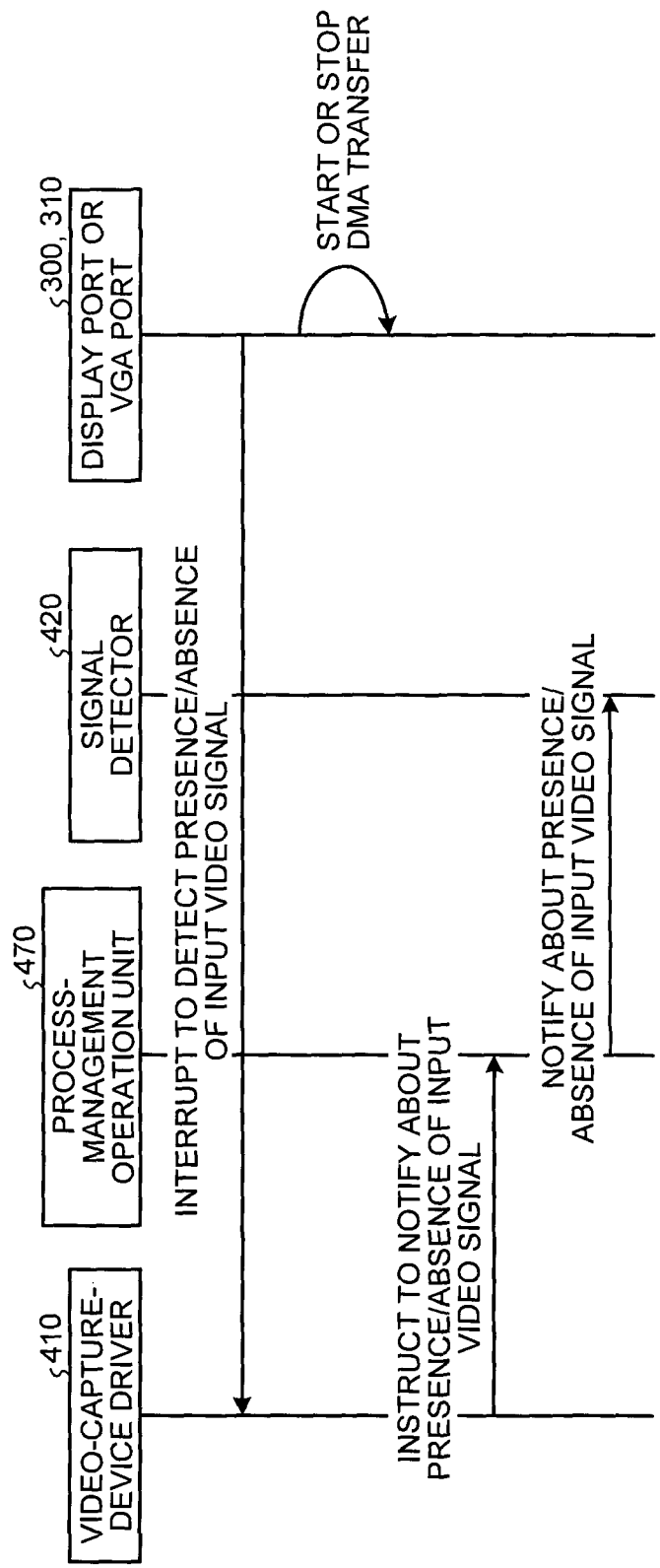

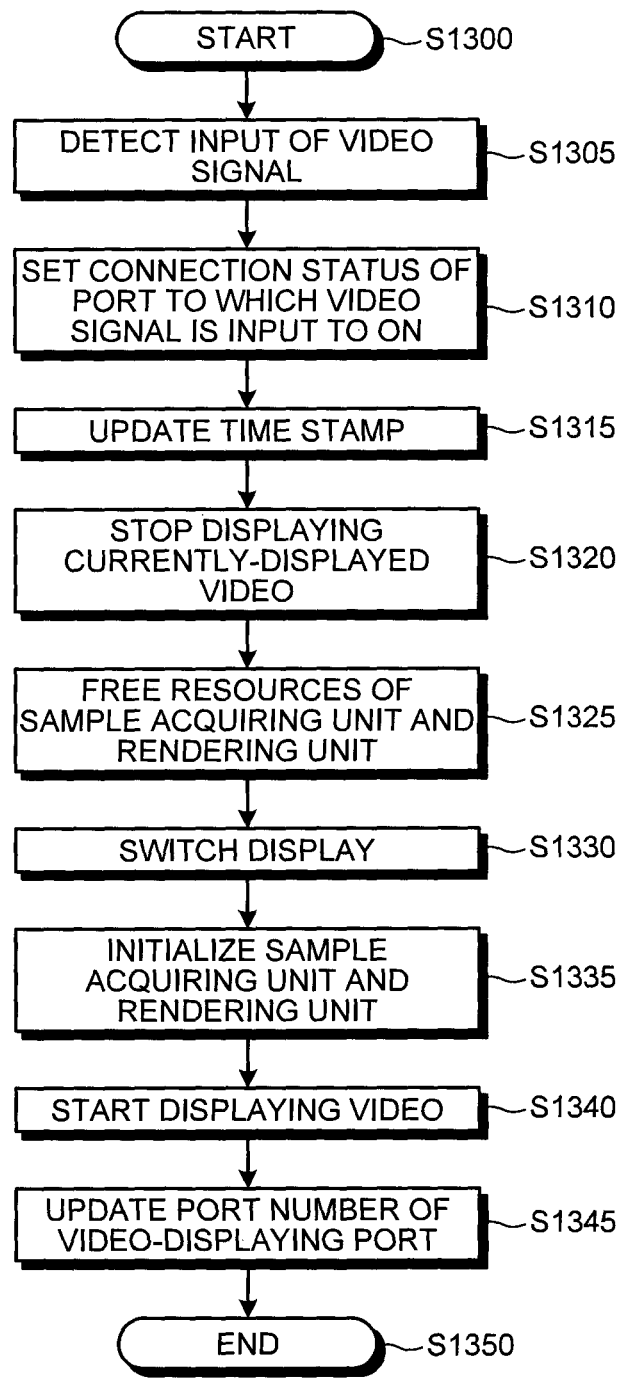

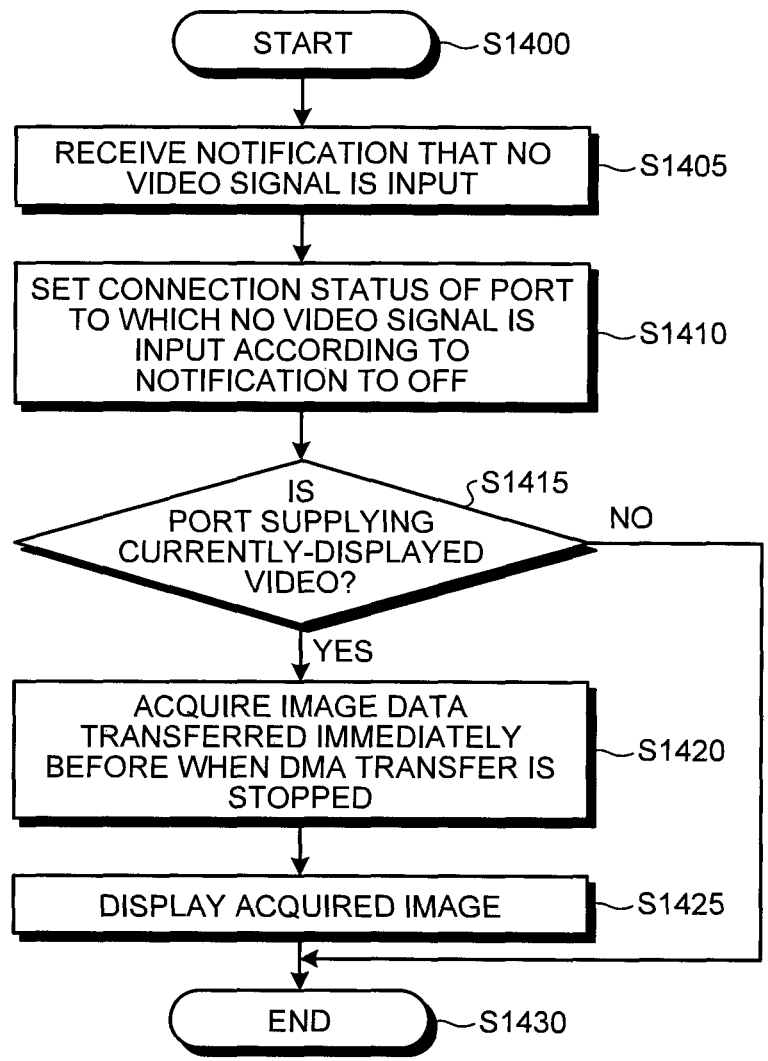

FIG.16

| DEVICE NUMBER | CONNECTION STATUS | TIME STAMP |
|---|---|---|
| 1 | ON | 09:20:35.16 |
| 2 | OFF | 09:14:35.18 |
| ... | ... | ... |
| N | ON | 09:10:22.32 |

DISPLAY CONTROL APPARATUS, IMAGE DISPLAY SYSTEM, DISPLAY CONTROL METHOD, AND COMPUTER-READABLE RECORDING MEDIUM WHICH DISPLAYS A CAPTURED IMAGE WITH AN OVERLAID INPUT IMAGE WHEN A VIDEO SIGNAL IS NOT INPUT

TECHNICAL FIELD

The present invention relates to a display control apparatus for controlling a video to be displayed on a display screen, an image display system that includes the display control apparatus, a display control method, and a computer-readable recording medium.

BACKGROUND ART

Electronic whiteboards, in which a touch panel is provided on flat panel display equipment such as liquid crystal displays and plasma displays, or display equipment using a projector, are used. The electronic whiteboards are used in education, conferences in companies, and the like because such an electronic whiteboard is connectable to a personal computer (PC) and capable of displaying an enlarged image of an image supplied from the connected PC.

The electronic whiteboard also has a function, which makes use of its touch panel feature, of allowing a user to operate a PC which is supplying an image displayed on the electronic whiteboard by directly touching the displayed image. An interactive whiteboard application program that runs on a PC also comes with the electronic whiteboard. The interactive whiteboard application program causes a screen to serve as a whiteboard and enables a user to handwrite characters and the like on the screen using the touch panel feature, to capture an image supplied from a PC and handwriting on the captured image in an overlaying manner, and the like.

Concrete example products of such an interactive whiteboard include StarBoard (registered trademark) of Hitachi Solutions, Ltd. and Cyber Conference System (registered trademark) of Pioneer Cooperation.

When such an electronic whiteboard that enables a user to handwrite characters and the like and superimpose handwriting on a captured image is used in a conference, notes and the like can be directly written onto a screen of the electronic whiteboard where a material for presentation is displayed as appropriate. Recording a screen image inclusive of the added notes and the like as required is also enabled. Accordingly, because displayed screen images can be played back and reused at closing of the conference, it becomes possible to draw a conclusion and the like efficiently.

Meanwhile, as video input techniques develop, equipment that supports a plurality of types of video inputs including High-Definition Multimedia Interface (HDMI) and Video Graphics Array (VGA) has proliferated. Along with this proliferation, video input cables of various specifications have come to be supported. Electronic whiteboards also support a plurality of video inputs and are connectable with video input cables of various specifications. Accordingly, a user can connect a plurality of PCs to an electronic whiteboard and switch an image displayed on the electronic whiteboard among images that are supplied from the different PCs.

A technique relevant to this is disclosed in Japanese Patent Application Laid-open 2002-366343, for example. According to this technique, a plurality of computers are connected to an electronic whiteboard via a switcher; any one of the computers is selected; a video signal is supplied from the selected computer to the electronic whiteboard; control signals are exchanged between the selected computer and the electronic whiteboard.

To use such an electronic whiteboard having these functions in a conference, it is desirable that operating the electronic whiteboard, displaying necessary information thereon, and inputting necessary information thereto can be performed without hindering the progress of the conference. However, conventional electronic whiteboards are disadvantageous in that when a video signal that is supplied from a device connected to the electronic whiteboard to display a video is stopped or when an operation such as withdrawing a connection cable is performed, the video is not displayed on the electronic whiteboard any more, causing the screen undesirably to become blank. This undesirably hinders the progress of the conference because the screen becomes blank during the conference.

Therefore, there is a need for a method and an apparatus for enabling continuous image display on an electronic whiteboard, rather than causing the electronic whiteboard to go blank, even when a cable between the electronic whiteboard and a device from which a currently-displayed image is supplied is disconnected.

DISCLOSURE OF INVENTION

It is an object of the present invention to at least partially solve the problems in the conventional technology.

According to an embodiment, there is provided a display control apparatus is connectable to a plurality of input devices, receives an input of a video signal from one of the plurality of input devices, and makes a control that causes a video to be displayed on a display apparatus. The display control apparatus includes a capturing unit configured to capture image data that represents a frame image of the input video signal; a signal detector configured to detect whether the video signal is input, and issue an instruction to cause the display apparatus to display the video or the frame image on the basis of a result of the detection; and a control unit configured to generate the frame image from the image data captured by the capturing unit most recently to cause the display apparatus to display the generated frame image when it is detected that the video signal is not input and the control unit receives the instruction to cause the display apparatus to display the frame image.

According to another embodiment, there is provided an image display system includes the display control apparatus according to the above embodiment; the display apparatus; and at least one of the plurality of input devices.

According to still another embodiment, there is provided a display control method to be performed by a display control apparatus that is connectable to a plurality of input devices, receives an input of a video signal from one of the plurality of input devices, and makes a control that causes a video to be displayed on a display apparatus. The display control method includes capturing image data representing frame images of the input video signal successively; detecting whether the video signal is input; issuing an instruction to cause the display apparatus to display the video or the frame image on the basis of a result of the detecting; generating successive frame images from the image data successively captured and displaying the successive frame images on the display apparatus when it is detected that the video signal is input and the instruction to cause the display apparatus to display the video is received; and generating the frame image from the image data captured most recently at the capturing and displaying the generated frame image on the display apparatus when it is detected that the video signal is not input and the instruction to cause the display apparatus to display the frame image is received.

According to still another embodiment, there is provided a computer-readable recording medium with an executable program stored thereon. The program instructs a computer to perform the display control method according to the above embodiment.

The above and other objects, features, advantages and technical and industrial significance of this invention will be better understood by reading the following detailed description of presently preferred embodiments of the invention, when considered in connection with the accompanying drawings.

BRIEF DESCRIPTION OF DRAWINGS

FIG. 6 is a diagram illustrating exemplary flags concerning signals input to ports set by the signal detector;

FIG. 12 is a sequence diagram illustrating a routine to be performed at occurrence of an interrupt;

FIG. 13 is a flowchart illustrating a procedure of an operation to be performed when the signal detector detects that a video signal is input;

FIG. 14 is a flowchart illustrating a procedure of an operation to be performed when the signal detector detects that a video signal is not input any more;

FIG. 16 is a diagram illustrating other exemplary flags concerning signals input to the ports.

BEST MODES FOR CARRYING OUT THE INVENTION

Preferred embodiments of the present invention are described below with reference to the accompanying drawings.

Figure 1:
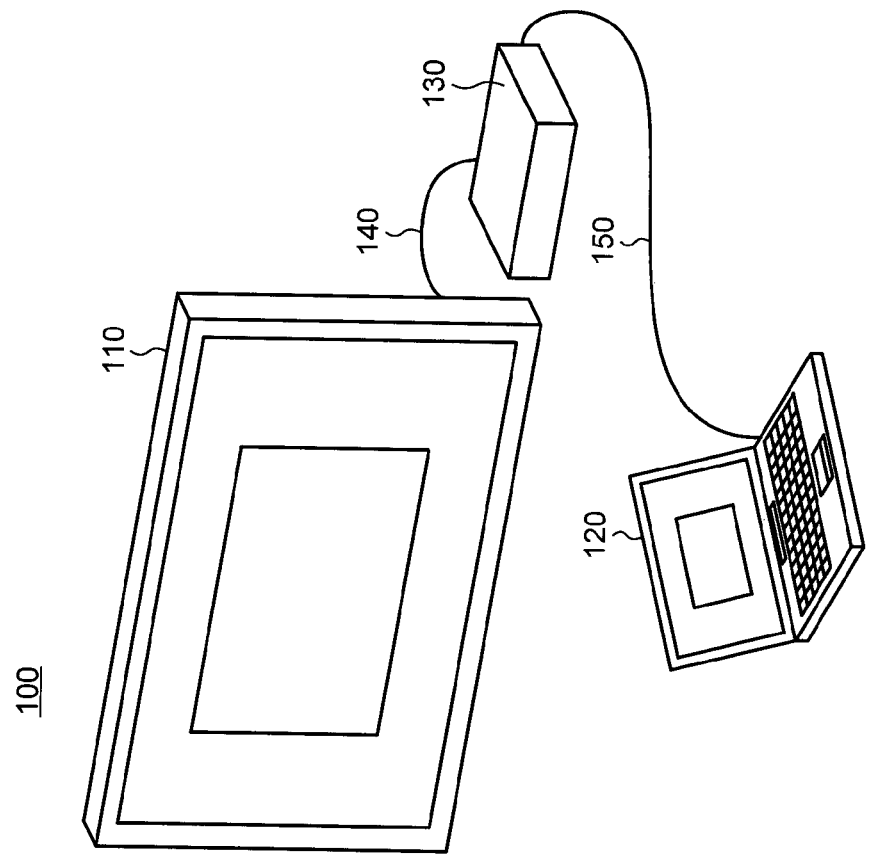
FIG. 1 is a diagram illustrating an exemplary configuration of an image display system according to a first embodiment of the present invention.

FIG. 1 is a diagram illustrating an exemplary configuration of an image display system 100 according to a first embodiment of the present invention. The image display system 100 includes a display apparatus 110 that displays a video, a PC 120, and a controller 130. The PC 120 serves as an input device that inputs image data representing frame images that make up the video to the display apparatus 110. The controller 130 is used as a display control apparatus that connects between the display apparatus 110 and the PC 120 and controls image display of the display apparatus 110. In this example, a separate configuration in which the display apparatus 110 and the controller 130 are independent from each other is employed. Alternatively, an integral configuration in which the display apparatus 110 and the controller 130 are housed in a same casing may be employed.

The display apparatus 110 is connected to the controller 130 with a cable 140 and displays a video by sequentially displaying successive frame images rendered by the controller 130 at a fixed speed. The display apparatus 110 includes a display unit that displays frame images and a data input unit that receives image data representing the frame images.

The image data representing a frame image is, for example, digital data provided as luminance values assigned to each pixel on a color-by-color basis. When the display unit receives the image data, the display unit displays the frame image by assigning the luminance values to each pixel at a corresponding position on a display screen. The digital data provides image data representing successive frame images at a fixed speed. Accordingly, the display unit can display a video on the display screen by reproducing the successive frame images.

The display unit may include a touch panel on its surface. When provided with the touch panel, the display unit can detect a position touched by a user using a touch position sensor which is a locator device included in the touch panel. There are a variety of touch panel technologies that differ in principle of operation. Examples of the technology are a resistive touch technology, a surface acoustic wave touch-sensing technology, an infrared touch-sensing technology, an electromagnetic induction touch-sensing technology, and a capacitive touch-sensing technology. Any one of these technologies can be employed. Information about positions touched by a user is transmitted to the controller 130 through a cable (not shown) as a user input and processed by the controller 130.

The display apparatus 110 may include a plurality of operation buttons. The operation buttons can be used to perform, for example, switching between a display mode provided only for displaying images and an input mode where manual input is enabled, switching between a touch mode where selection and input of characters and the like by finger touch are enabled and a pen mode where selection and input of characters and the like using a stylus pen is enabled, changing a color to be input with the pen, switching display on a tool bar, operating an eraser tool for use in erasing input characters and the like, and operations on the PC.

When the display unit includes the touch panel, the controller 130 can determine which operation is performed by a user by touching the touch panel based on a mode and the like selected using the operation buttons on the display apparatus 110. Examples of the operation include selecting a position, enlarging or reducing an image, and inputting characters or the like. When the controller 130 is placed in the input mode where characters and the like can be manually input, the controller 130 can receive information about successively-touched positions on the screen as user input, generate image data representing a character or the like from the information, generate image data to be overlaid on a currently-displayed image, and input the generated image data to the display apparatus 110.

The data input unit successively receives image data representing a frame image from the controller 130. In the first embodiment, the data input unit can be an HDMI input connector that includes an HDMI terminal, a VGA input connector that includes a VGA terminal, and the like and is capable of receiving image data representing successive frame images as an HDMI signal or a VGA signal from the controller 130 via the video cable 140. In an alternate embodiment, the data input unit may receive image data representing frame images input from the controller 130 by carrying out wireless communications based on a wireless communication protocol such as Bluetooth (registered trademark) or Wi-Fi (registered trademark). For this reason, the display apparatus 110 and the controller 130 can include transceivers for transmitting and receiving radio waves.

The PC 120 includes a display screen and inputs image data representing an image displayed on the display screen to the display apparatus 110 via the controller 130. Accordingly, the PC 120 is connected to the controller 130 with a cable 150. The PC 120 can be a desktop PC, a notebook PC, or a tablet PC, for example. The PC 120 can alternatively be a cellular phone, a smart phone, a personal digital assistant (PDA), or the like. The PC 120 can include an HDMI input connector or a VGA input connector similar to that of the data input unit because the PC 120 is connected to the controller 130 via the cable 150. In this example, the PC 120 is connected to the controller 130 with the cable 150. Alternatively, the PC 120 may include a transceiver for transmitting and receiving radio waves so that the PC 120 is wirelessly connected to the controller 130.

The PC 120 includes a processor such as a Pentium (registered trademark) processor or a compatible processor and can execute a program described in a programming language such as assembler, C, C++, Java (registered trademark), JavaScript (registered trademark), Perl, Ruby, or Python under control of an operating system (OS) such as Windows (registered trademark), UNIX (registered trademark), Linux (registered trademark), ITRON, or micro industrial TRON (μITRON). The PC 120 includes a random access memory (RAM) that provides a memory space for execution of the program and a hard disk drive (HDD) for persistently holding the program, data, and the like. The PC 120 executes a program that generates a video signal and inputs the video signal to the controller 130 to cause the display apparatus 110 to display a video.

The controller 130 processes the image data representing the frame image of the video signal received from the PC 120, generates image data representing a composite image created by overlaying an image of a handwritten character and the like on the frame image as required, and inputs the image data to the display apparatus 110. The controller 130 contains a program for performing this operation. This program can be distributed as being stored in a computer-readable recording medium, such as an HDD, a compact disc (CD)-read only memory (ROM), a magneto optical (MO), a flexible disk, an electrically erasable programmable read-only memory (EEPROM), or an erasable programmable random read-only memory (EPROM). Alternatively, the program can be provided by downloading over a network.

Figure 2:
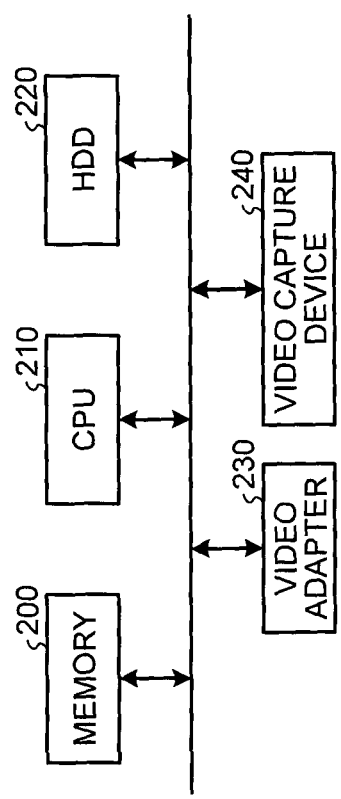
FIG. 2 is a diagram illustrating a hardware structure of a controller corresponding to a display control device according to the first embodiment.

The controller 130 is described in detail below with reference to FIGS. 2 to 4. FIG. 2 is a diagram illustrating a hardware structure of the controller 130. The controller 130 has a PC architecture and includes a memory 200, a CPU 210, an HDD 220, a video adapter 230, and a video capture device 240. The memory 200 is used to store data and instructions. The HDD 220 is used for long-term storage of an application program (hereinafter, "application"), an OS, and the like. The CPU 210 reads out the data and the instructions from the memory 200, reads out the application, the OS, and the like from the HDD 220, and executes them. By executing them, the CPU 210 controls image display of the display apparatus 110.

The video adapter 230 inputs image data representing a frame image to the display apparatus 110 and causes the frame image to be displayed on the display screen of the display apparatus 110. The video capture device 240 captures image data representing a frame image contained in a video signal, which is input from the PC 120, from the video signal and stores the image data in the memory 200. Thus, the video capture device 240 functions as a capturing unit.

Figure 3:
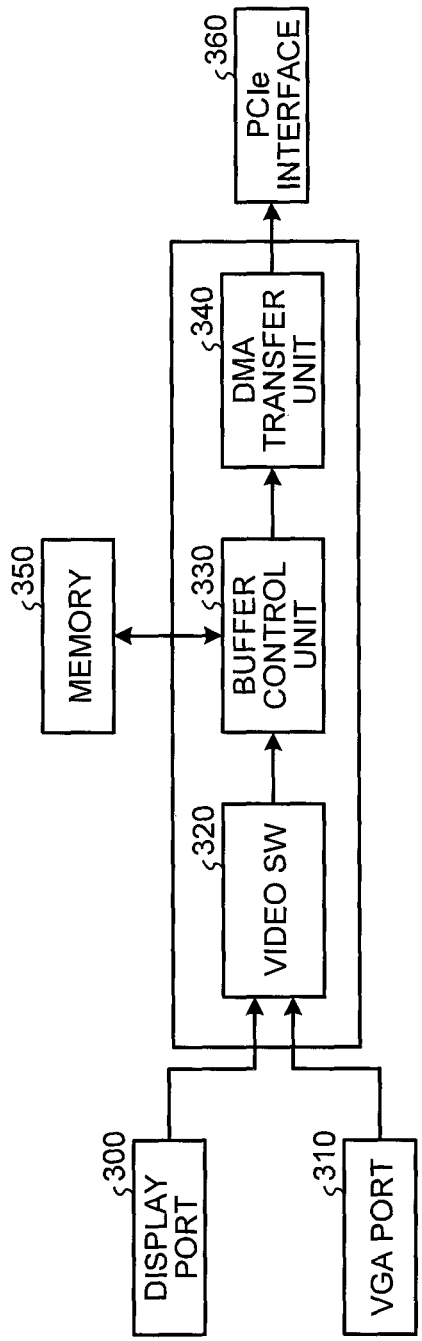
FIG. 3 is a diagram illustrating an exemplary hardware structure of a video capture device.

An example hardware structure of the video capture device 240 is illustrated in FIG. 3. The video capture device 240 includes a display port 300 and a VGA port 310 for receiving a video signal input from the PC 120. The display port 300 is a video input interface designed for a digital display apparatus such as a liquid crystal display and provided for receiving digital visual interface (DVI) signals. The VGA port 310 is a video input interface provided for receiving RGB-component video signals.

The display port 300 includes a display receiver. The VGA port 310 includes a VGA receiver. These receivers quantize input signals. Each of the receivers scans the quantized signal and passes it to a buffer control unit 330, which will be described later, one line by one line at fixed intervals.

A video switcher (SW) 320 connected to each of the display port 300 and the VGA port 310 selects any one of the display port 300 and the VGA port 310 and passes a quantized signal received from the selected port to the buffer control unit 330. The buffer control unit 330 receives the quantized, or digital, signal via the video SW 320 and temporality stores the digital signal as image data representing a frame image in a memory 350. After all data has been transferred to the buffer control unit 330 via the video SW 320 and temporarily stored in the memory 350, the buffer control unit 330 instructs a digital memory access (DMA) transfer unit 340 to start DMA. DMA is a scheme that enables an input/output device to transfer data to and from a memory without involving a CPU.

On receiving the instruction, the DMA transfer unit 340 transfers the image data representing the frame image that is ready to be transferred from the memory 350 via a Peripheral Component Interconnect Express (PCIe) interface 360 to the memory 200 of the controller 130 by utilizing the buffer control unit 330. The image data representing the frame image may be overwritten and updated each time such image data is transferred from the DMA transfer unit 340; alternatively, a configuration in which each time such image data is transferred from the DMA transfer unit 340, the image data is additionally stored in the memory 200 as an independent file may be employed. In view of a fact that the memory 200 has an upper limit incapacity, it is desirable to overwrite and update the image data to hold only latest image data.

The PCIe interface 360 breaks the image data representing the frame image into packets, adds sequence numbers and error-detecting codes to the packets, and transfers the packets to the memory 200 as serial data.

In the controller 130, the CPU 210 calls and executes the OS stored in the HDD 220 and, under control of the OS, loads and executes the application. The controller 130 according to the first embodiment is illustrated in FIG. 4. By executing the OS, the CPU 210 functions as a rendering operation unit 400 and a video-capture-device driver 410. By executing the application, the CPU 210 functions as a signal detector 420, a reproduction control unit 430, a sample acquiring unit 440, a rendering unit 450, and a handwriting operation unit 460.

The rendering operation unit 400 generates a drawing instruction for the application and other software and controls the video adapter 230 so as to display a composite image of two images on the display screen of the display apparatus 110. The video-capture-device driver 410 controls the video capture device 240.

The rendering operation unit 400 can implement its function by utilizing functions provided by the OS. For example, when the OS is Windows OS, the rendering operation unit 400 can utilize functions of Desktop Windows Manager, graphics device interface (GDI), DirectX, and the like. The video-capture-device driver 410 controls the video capture device 240 by setting a value held in a register (hereinafter, "register value") of the video capture device 240 and specifying a target physical address in the memory 350 for DMA transfer, for example.

The signal detector 420 detects whether an input video signal is present via the video-capture-device driver 410. The reproduction control unit 430 functions as part of a control unit and controls operations of the sample acquiring unit 440 and the rendering unit 450 according to an instruction fed from the signal detector 420 or a user. The sample acquiring unit 440 also functions as part of the control unit and issues an instruction to capture images one frame by one frame via the video-capture-device driver 410.

The rendering unit 450 also functions as part of the control unit. The rendering unit 450 instructs the rendering operation unit 400 to create a composite image by overlaying a user-handwritten image generated by the handwriting operation unit 460 on an image displayed on the screen of the PC 120 and display the composite image at a designated portion on the display screen of the display apparatus 110. The handwriting operation unit 460 acquires information about a character, graphics, and the like input by a user by touching the display screen and generates an input image for use in creating the composite image from the acquired information. The information acquired by the handwriting operation unit 460 is, for example, position coordinates of touched positions.

The rendering operation unit 400 generates image data representing the composite image, inputs the image data to the display apparatus 110, and causes the display unit to display the composite image. In this example, the composite image is caused to be displayed; however, when no handwritten image is input, it is unnecessary to create a composite image.

Even when a video signal is not input any more, the controller 130 automatically captures a video in advance; accordingly, the captured video can be displayed. Therefore, even when the cable is disconnected during a conference, it is unnecessary to manually switch the screen. A display scheme that will not hinder the progress of the conference, which is desirable for a user, can thus be implemented.

Figure 5:
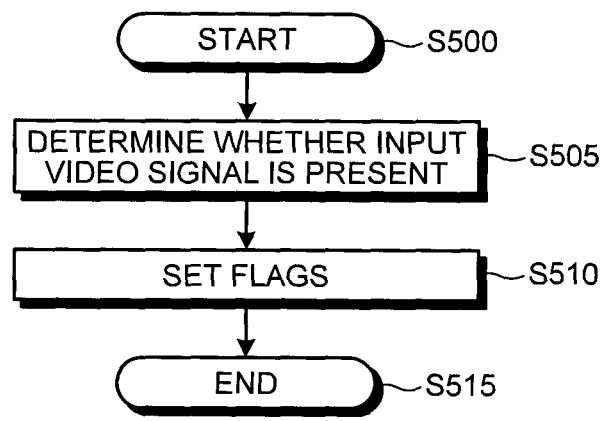
FIG. 5 is a flowchart illustrating a procedure of an operation to be performed by a signal detector of the controller.

These operations to be performed by the controller 130 are described in detail below. First, an operation to be performed by the signal detector 420 at startup of the controller 130 is described below. FIG. 5 is a flowchart illustrating a procedure of the operation to be performed by the signal detector 420. The operation starts from Step S500. At Step S505, the signal detector 420 inquires each of the display port 300 and the VGA port 310 of the video capture device 240 whether a video signal is input to the port by utilizing a register access function of the video-capture-device driver 410.

The register value held by the video capture device 240 is a value indicating whether a video signal is input. The signal detector 420 can determine whether an input video signal is present by reading this register value.

Next, at Step S510, a flag indicating a connection status is set for each of the ports. Example flags are shown in the table illustrated in FIG. 6. Each of the flags indicates a connection status as to whether an input device is connected to a port, and is associated with a port number assigned to the corresponding port and time stamp indicating time when the input device is connected to the port. In FIG. 6, ON and OFF are assigned as follows: ON indicates a connection status where a video signal is input; OFF indicates a connection status where no video signal is input. At Step S510, as initial statuses of all the ports, the flags are set to OFF and time stamps are set to zero.

If, for example, it is determined that a video signal is input to a port of which port number is 2, the connection status for this port is set to ON, and time at this point in time is set to time stamp. When the flags have been set for all the ports, control proceeds to Step S515 where this startup operation ends.

An operation to be performed by the controller 130 after the startup operation is described below with reference to first to third flowcharts illustrated in FIGS. 7 to 9. The operation starts from Step S700 in the first flowchart illustrated in FIG. 7. At Step S705, the signal detector 420 determines, for each of the ports, whether an input video signal to the port is present at fixed time intervals. More specifically, after the controller 130 has started up, an OS timer interrupt occurs at fixed time intervals. Accordingly, the signal detector 420 monitors the timer interrupt and, on detecting occurrence of the timer interrupt, accesses the video capture device 240 via the video-capture-device driver 410 to read out the register value held by the video capture device 240. The signal detector 420 can thus determine whether an input video signal is present based on the register value.

At Step S710, the signal detector 420 compares a connection status of one port with a connection status set to the flag of the port. At Step S715, the signal detector 420 makes determination as to whether the connection status has changed. When the connection status remains the same as that in previous determination, control proceeds to Step S720 where the signal detector 420 provides an instruction to the reproduction control unit 430. According to the instruction, the reproduction control unit 430 controls operation of the sample acquiring unit 440 so as to accept and acquire image data representing frame images that make up a video from an input device that is connected to the port. The signal detector 420 instructs the rendering unit 450 to input the image data representing the frame images to the display apparatus 110 and determines whether the video is displayed.

When the video is being displayed, the video is supplied from the input device connected to the port number with which latest time stamp is associated. Accordingly, at Step S725, the controller 130 causes the signal detector 420 to temporarily store an image captured by the video capture device 240 via the video-capture-device driver 410 in order to continue display.

This captured image is also used as an image to be displayed in a case where the input device from which the currently-displayed video is supplied is disconnected. Specifically, the captured image is stored in the memory 350 as image data representing a frame image. At occurrence of disconnection, the captured image is read out from the memory 350, rendered by the video adapter 230, and displayed on the display screen of the display apparatus 110. More specifically, the signal detector 420 fetches the image data from the memory 350. The signal detector 420 instructs the reproduction control unit 430, which in turn instructs the rendering unit 450, which in turn instructs the rendering operation unit 400. The rendering operation unit 400 performs rendering using the video adapter 230.

On the other hand, when the video is not displayed, it can be concluded that a PC or the like is not connected to the port neither in the previous determination nor in the current determination, or that although a PC or the like is connected to the port, the video is not displayed because time indicated by time stamp is old. In this case, the signal detector 420 performs no operation, and control proceeds to Step S745.

When it is determined at Step S715 that the connection status has changed, control proceeds to Step S730 where the flag is updated. This is because when an input signal was absent in the previous determination and the connection status has changed, an input signal is present presently, while when an input signal was present in the previous determination and the connection status has changed, an input signal is absent presently. Determination as to whether the connection status is ON and an input video signal is present is made by referring to the updated flag at Step S735. When an input video signal is present, it is suggested that an input device that supplies the video signal is newly connected to the port. Accordingly, time stamp of the flag is updated at Step S740. Then, control proceeds to Step S745.

When it is determined that the connection status is OFF and an input video signal is absent at Step S735, it is suggested that disconnection has occurred. Accordingly, control proceeds to Step S745 with no action. Time stamp is not updated when disconnection occurs because time stamp indicates time when an input device is connected. However, after an image is captured at Step S725, control proceeds to Step S740 and time stamp is updated to time when the image is captured even though an input device is not newly connected.

At Step S745, comparison between the connection status and the connection status set to the flag of the port is made for every port. When there is a port for which the comparison is not made yet, control goes back to Step S710 to perform the comparison of the not-yet-compared port. On the other hand, when the comparison has been made for every port, control proceeds to process steps via connector A shown in FIG. 7.

Figure 7:
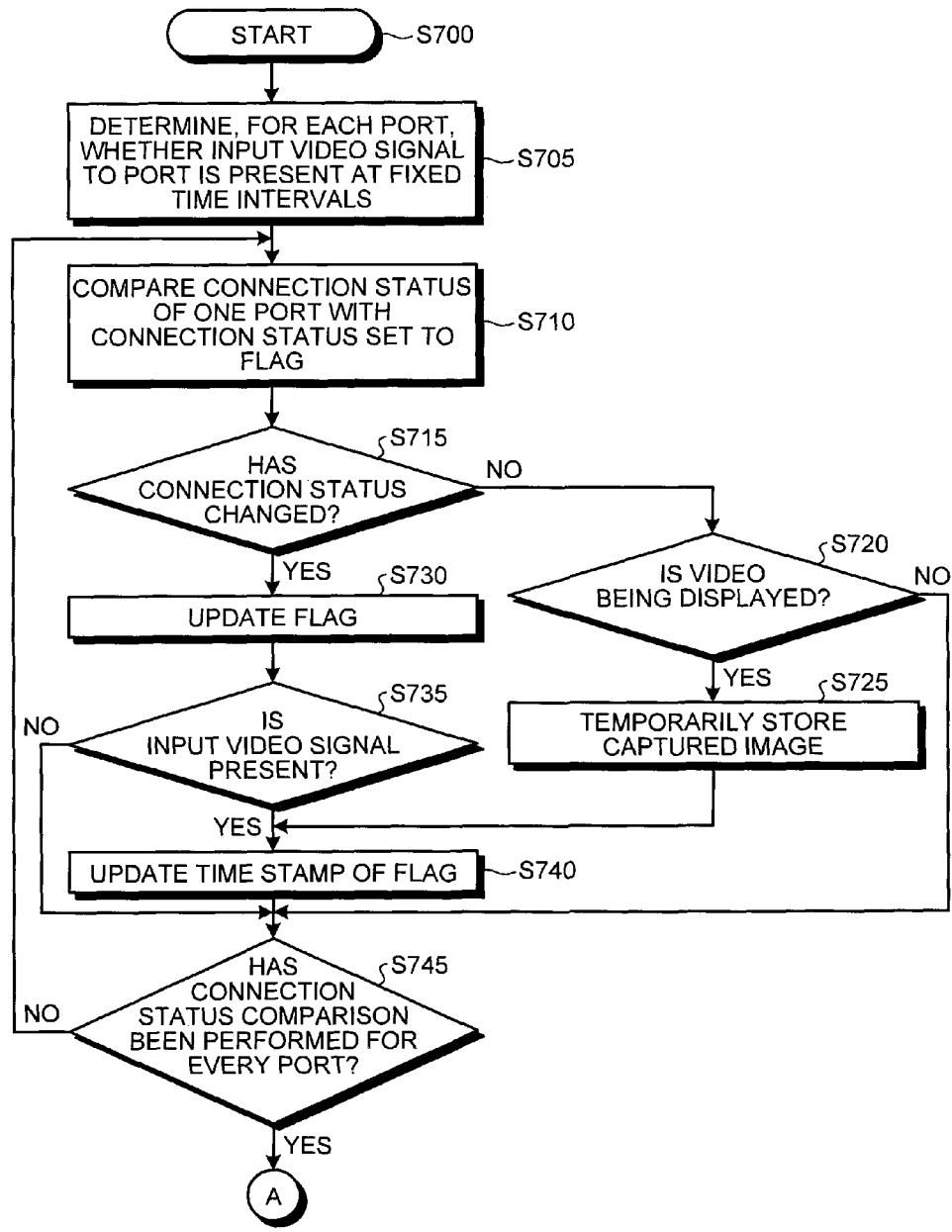
FIG. 7 is a first flowchart illustrating a procedure of operations to be performed by the controller.
Figure 8:
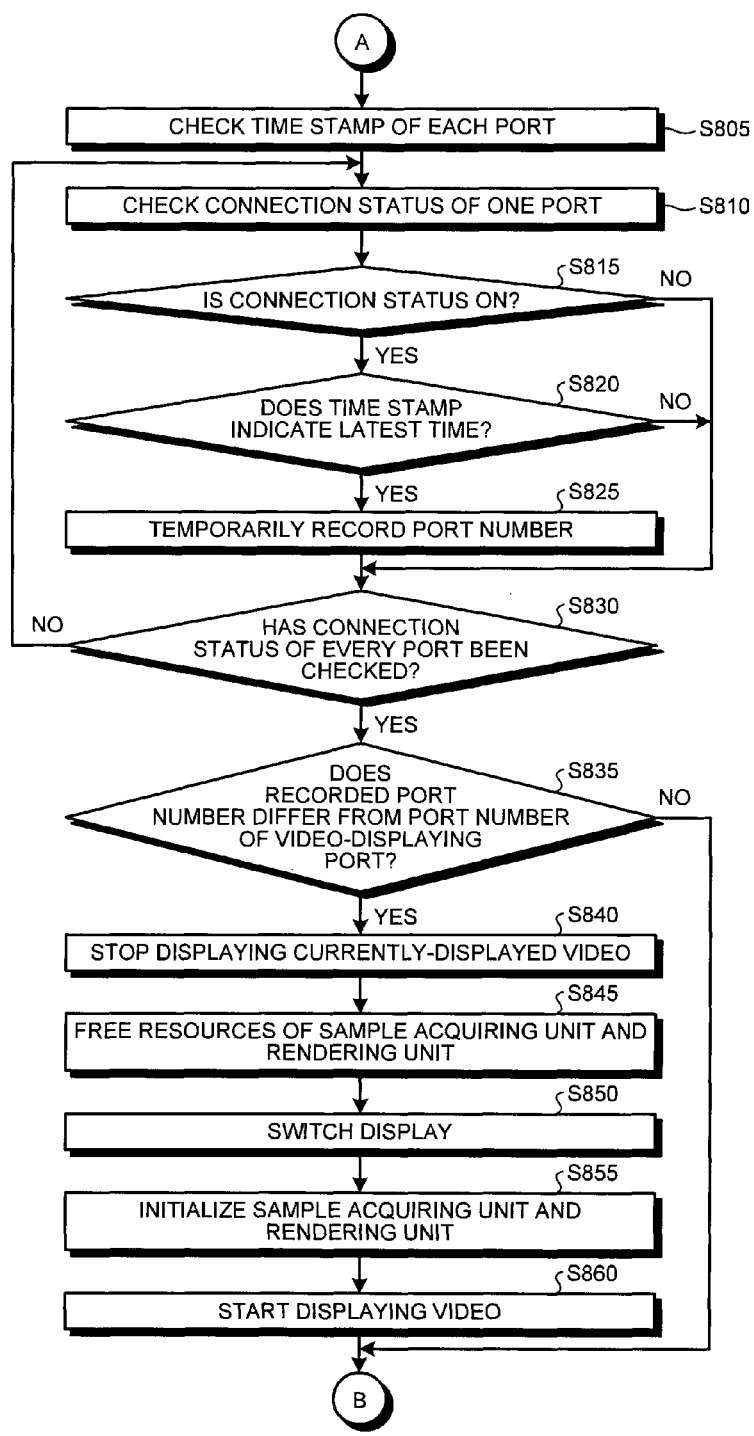
FIG. 8 is a second flowchart illustrating the procedure of the operations to be performed by the controller.

FIG. 8 is the second flowchart, continued from the first flowchart illustrated in FIG. 7, illustrating the procedure of the operation to be performed by the controller 130. At Step S805, the signal detector 420 checks time stamp of each of the ports corresponding to the respective flags. Next, at Step S810, the signal detector 420 checks a connection status of one port. At Step S815, the signal detector 420 determines whether the connection status is ON. When the connection status is ON, control proceeds to Step S820 where the signal detector 420 determines whether time stamp of the port indicates latest time. If so, control proceeds to Step S825 where the signal detector 420 temporarily records a port number of the port. Then, control proceeds to Step S830.

When it is determined that the connection status is OFF at Step S815 or when it is determined the time stamp does not indicate latest time, control proceeds to Step S830. At Step S830, whether the connection status of every port has been checked is determined. When there is a port of which connection status is not checked yet, control goes back to Step S810 to check the connection status of the not-yet-checked port by performing processes from Step S810 to Step S825.

When it is determined that the connection status of every port has been checked at Step S830, control proceeds to Step S835 where comparison between a port number of a port (hereinafter, "video-displaying port") to which a video signal of a video that is currently displayed on the display screen of the display apparatus 110 is input and the port number that is temporarily recorded at Step S825 is made to determine whether the port numbers are different. A variable that specifies this video-displaying port is updated each time when a new input is detected. In an initial state, a dummy value is assigned to the variable.

When it is determined that the port numbers are different at Step S835, control proceeds to Step S840 where displaying the currently-displayed video is stopped. It is desirable that a latest video, which is a video supplied from an input device that is connected to the controller 130 at latest time, is displayed on the display screen of the display apparatus 110. When the port numbers are determined to be different at Step S835, it is suggested that the currently-displayed video is not the latest video. Accordingly, displaying the currently-displayed video that is older than the latest video is stopped to perform switching to the latest video at Step S840.

At Step S845, the signal detector 420 instructs the reproduction control unit 430 to free resources of the sample acquiring unit 440 and the rendering unit 450 so that the latest video can be captured. As a result, the sample acquiring unit 440 stops capturing a next frame image of the currently-displayed video; the rendering unit 450 also stops image rendering on the display screen of the display apparatus 110.

At Step S850, the video-capture-device driver 410 switches the video SW 320 to an input device that is connected to the input port at latest time, and receives an input of a video signal from the input device. At Step S855, the reproduction control unit 430 initializes the sample acquiring unit 440 and the rendering unit 450. At Step S860, the reproduction control unit 430 instructs the sample acquiring unit 440 to start capturing a video sample and the rendering unit 450 to start rendering on the display screen of the display apparatus 110, thereby starting displaying the video. Thereafter, control proceeds to process steps via connector B shown in FIG. 8.

When it is determined that the port numbers are identical at Step S835, displaying the currently-displayed video is to be continued. Accordingly, it is unnecessary to perform processes from Step S840 to Step S860, and control directly proceeds to process steps via the connector B shown in FIG. 8.

Figure 9:
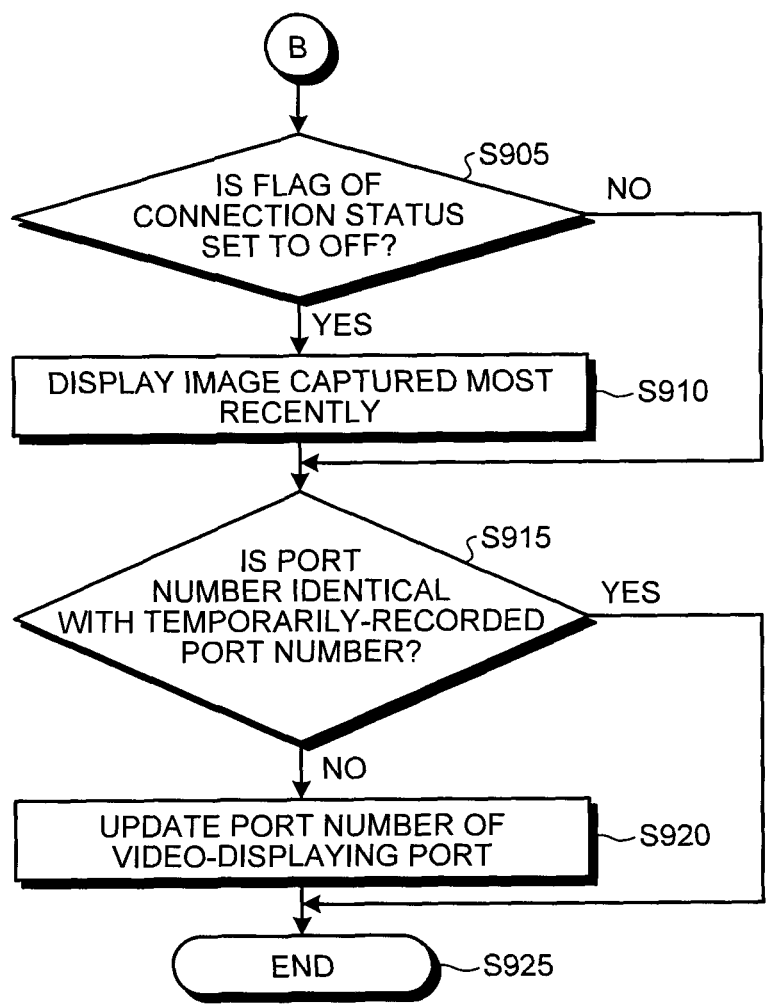
FIG. 9 is a third flowchart illustrating the procedure of the operations to be performed by the controller.

FIG. 9 is the third flowchart, continued from the second flowchart illustrated in FIG. 8, illustrating the procedure of the operation to be performed by the controller 130. At Step S905, the signal detector 420 refers to a flag of the video-displaying port to determine whether the connection status set to the flag is OFF.

When the connection status set to the flag of the video-displaying port is not OFF, control proceeds to Step S915 where the signal detector 420 determines whether the port number of the video-displaying port is identical with the temporarily-recorded port number. When the port numbers differ from each other, control proceeds to Step S920 where the port number of the video-displaying port is updated. At Step S925, this operation ends.

On the other hand, when the connection status set to the flag of the video-displaying port is OFF, it is suggested that disconnection has occurred. Accordingly, an image captured most recently before the port is disconnected is displayed. To perform this, control proceeds to Step S910 where image data representing the image captured most recently is fetched from the memory 350, and the image is displayed on the display screen of the display apparatus 110. After displaying the image, control proceeds to Step S915 where, as already described above, determination as to whether the port number of the video-displaying port is identical with the temporarily-recorded port number is made. When the port numbers differ from each other, the port number of the video-displaying port is updated. At Step S925, this operation ends.

When it is determined that the port number of the video-displaying port is identical with the temporarily-recorded port number at Step S915, control directly proceeds to Step S925 where this operation ends.

Figure 10:
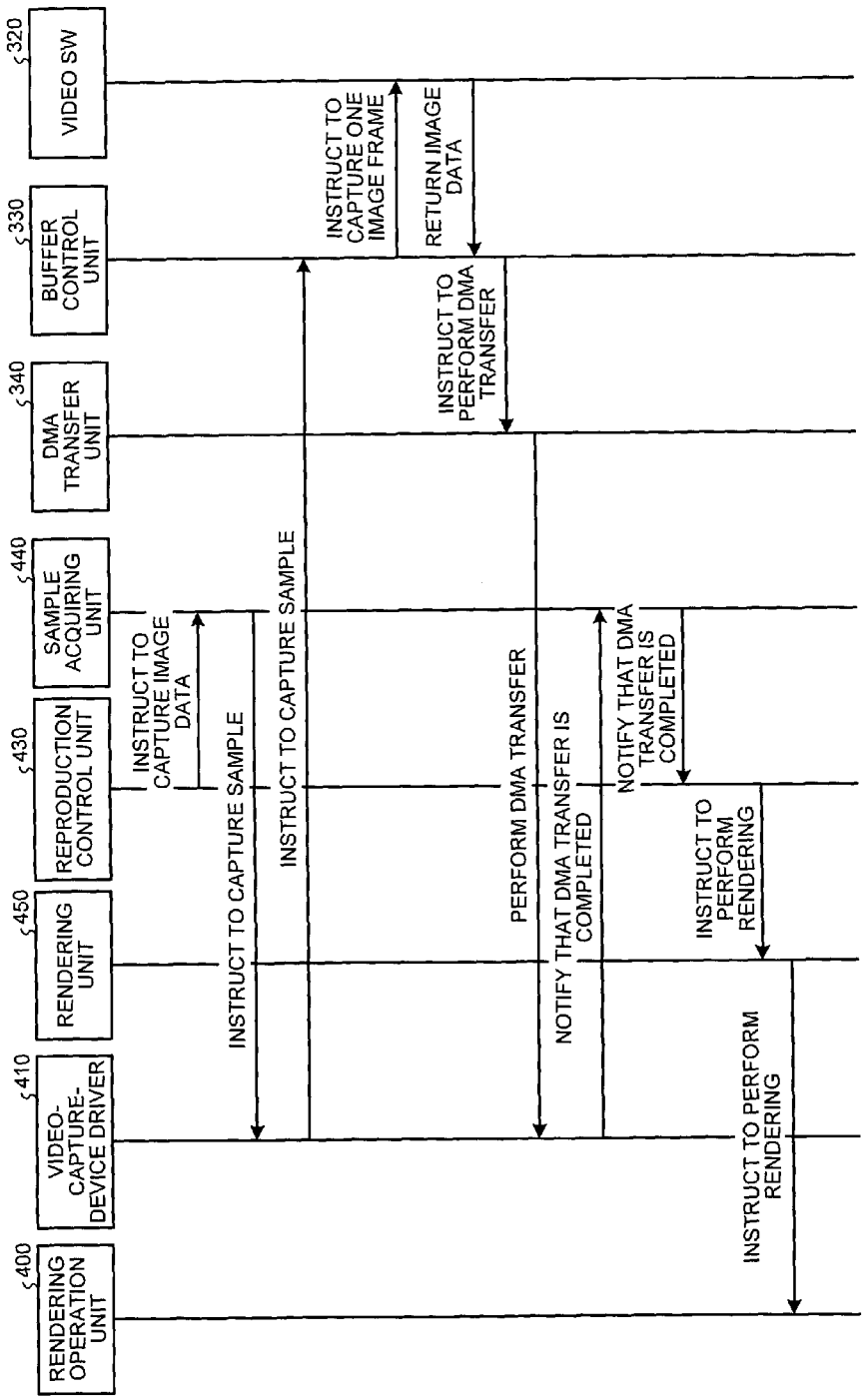
FIG. 10 is a sequence diagram illustrating video reproduction.

The operations to be performed by the controller 130 have been described in detail above. Hereinbelow, how the constituents of the controller 130 operate when reproducing a video is described with reference to the sequence diagram illustrated in FIG. 10. The controller 130 includes in terms of hardware the CPU 210, the HDD 220, and the video capture device 240. The CPU 210 executes the application and the OS stored in the HDD 220, thereby functioning as the rendering operation unit 400, the video-capture-device driver 410, the rendering unit 450, the reproduction control unit 430, and the sample acquiring unit 440.

To display a video on the display screen of the display apparatus 110, it is necessary to capture image data representing frame images that make up the video. Accordingly, on receiving an instruction from the signal detector 420 or a user, the reproduction control unit 430 instructs the sample acquiring unit 440 to capture the image data. This instruction designates an input device from which the image data is to be captured by a port number of a port to which the input device is connected. The sample acquiring unit 440 needs to call the video capture device 240 that receives an input of the video signal to capture a sample which is the image data. Therefore, the sample acquiring unit 440 instructs the video-capture-device driver 410 to call up the video capture device 240 and capture the sample.

On receiving the instruction from the sample acquiring unit 440, the video-capture-device driver 410 calls up the video capture device 240 and instructs the buffer control unit 330 of the video capture device 240 to capture the sample. When receiving the instruction, the buffer control unit 330 instructs the video SW 320 to capture quantized image data representing one frame image. The video SW 320 captures the image data representing the one frame image that is input to the port of the designated port number and output from the port.

The video SW 320 returns the captured image data representing the one frame image to the buffer control unit 330. The buffer control unit 330 receives the image data representing the one frame image and instructs the DMA transfer unit 340 to perform DMA transfer. The DMA transfer unit 340 performs DMA transfer of the image data to a designated memory address according to the instruction fed from the video-capture-device driver 410.

When the DMA transfer unit 340 completes the DMA transfer of the image data, the DMA transfer unit 340 sends a notification to the video-capture-device driver 410. On receiving the notification, the video-capture-device driver 410 notifies the sample acquiring unit 440 that the sample capturing is completed and passes information about a memory address where the image data is stored and data size of the image data to the sample acquiring unit 440. The sample acquiring unit 440 notifies the reproduction control unit 430 that the sample capturing is completed and passes the information about the memory address and the data size to the reproduction control unit 430.

The reproduction control unit 430 passes the information to the rendering unit 450 and instructs the rendering unit 450 to perform rendering to cause the video to be displayed. The rendering unit 450 accesses the memory address to fetch the image data representing the one frame image, processes the image data, and instructs the rendering operation unit 400 to perform rendering. On receiving the instruction, the rendering operation unit 400 performs rendering on the display screen to display the one frame image thereon as instructed.

After notifying the reproduction control unit 430 that capture of the image data representing the one frame is completed, the sample acquiring unit 440 instructs the video-capture-device driver 410 to perform sample capturing to capture image data representing a next frame image. In this way, the controller 130 captures image data representing all the frame images, and renders and displays the frame images one by one in captured order, thereby displaying the video on the display screen of the display apparatus 110.

Figure 4:
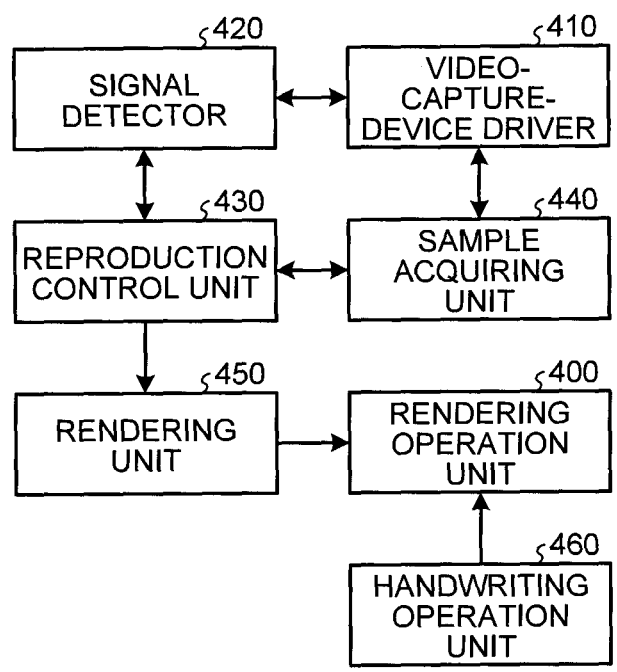
FIG. 4 is a functional block diagram illustrating the controller according to the first embodiment.

The controller 130 illustrated in FIG. 4 is configured to determine whether an input video signal is present at fixed time intervals. Alternatively, the controller 130 can be configured so as to send a notification to the signal detector 420 by an interrupt when a change occurs in the presence or absence of an input video signal. Illustrated in FIG. 11 is an example configuration of the controller 130 that can implement this scheme.

Figure 11:
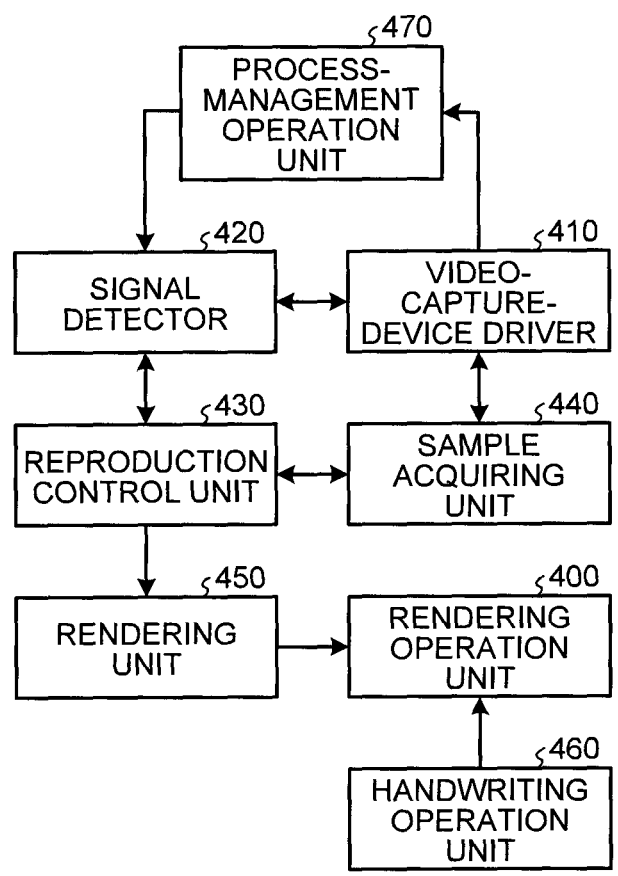
FIG. 11 is a functional block diagram illustrating a controller according to a second embodiment of the present invention.

FIG. 11 is a functional block diagram illustrating the controller 130 according to a second embodiment of the present invention. The controller 130 according to the second embodiment is identical with that of the first embodiment in that the controller 130 includes the rendering operation unit 400, the video-capture-device driver 410, the signal detector 420, the reproduction control unit 430, the sample acquiring unit 440, the rendering unit 450, and the handwriting operation unit 460; however, the controller 130 according to the second embodiment differs from that of the first embodiment in additionally including a process-management operation unit 470. Because the rendering operation unit 400 and the like have already been described, only the process-management operation unit 470 is described below.

The process-management operation unit 470 is described with reference to the sequence diagram illustrated in FIG. 12. Each of the display port 300 and the VGA port 310 includes a receiver. The receiver detects a change in the presence or absence of an input video signal, or, more specifically, a status change from a status where an input video signal is present to a status where an input video signal is absent, and vice versa. Each of the display port 300 and the VGA port 310 starts DMA transfer when an input of a video signal to the port is started, while each of the display port 300 and the VGA port 310 stops DMA transfer when the video signal is not input to the port any more.

The change in the presence or absence of an input video signal is transmitted to the CPU 210 that executes the OS. In response thereto, the CPU 210 causes an OS interrupt to occur. The video-capture-device driver 410 that is implemented by execution of the OS detects this interrupt. The video-capture-device driver 410 calls up the process-management operation unit 470 to cause the process-management operation unit 470 to handle this interrupt.

The process-management operation unit 470 holds a callback function that calls an application that has been registered during startup of the controller 130. The callback function describes a routine for detecting an interrupt and a routine to be performed at occurrence of the interrupt. The video-capture-device driver 410 sends a notification about the interrupt to the process-management operation unit 470. The process-management operation unit 470 detects the interrupt on receiving the notification and transmits a notification about the presence or absence of an input video signal to the signal detector 420 as the routine to be performed. On receiving this notification, the signal detector 420 performs the operations described above. Examples of the callback function include a function that processes a Windows message when the OS is Windows OS.

For example, on receiving a notification that an input signal is present, the signal detector 420 performs an operation illustrated in FIG. 13. The operation illustrated in FIG. 13 starts from Step S1300. At Step S1305, an input of a video signal is detected. At this time, a port number of a port to which the video signal is input is acquired. At Step S1310, a connection status of a flag associated with the port number is changed from OFF to ON. Examples of the flag are shown in FIG. 6. This action corresponds to Step S730 in the flowchart illustrated in FIG. 7.

The signal detector 420 updates time stamp of the flag at Step S1315 because the signal detector 420 has received the notification that the input signal is present. Therefore, this time stamp indicates latest time. Input of the video signal is started at this point. Accordingly, if a video is currently displayed on the display screen of the display apparatus 110, the newly-input video signal differs from a video signal of the currently-displayed video.

Displaying the currently-displayed video is stopped at Step S1320. This action corresponds to Step S840 of the flowchart illustrated in FIG. 8. This action is performed to perform switching to the newly-input video signal to thereby display a video of the newly-input video signal.

Next, at Step S1325, the signal detector 420 instructs the reproduction control unit 430 to free resources of the sample acquiring unit 440 and the rendering unit 450. As a result, the sample acquiring unit 440 stops capturing a next frame image of the currently-displayed video; the rendering unit 450 stops image rendering on the display screen of the display apparatus 110.

At Step S1330, the video-capture-device driver 410 switches the video SW 320 to the port to accept the newly-input video signal from an input device that is connected to the port. At Step S1335, the reproduction control unit 430 initializes the sample acquiring unit 440 and the rendering unit 450. At Step S1340, the reproduction control unit 430 instructs the sample acquiring unit 440 to start capturing a video sample and the rendering unit 450 to start rendering on the display screen of the display apparatus 110, thereby starting displaying the video. Thereafter, control proceeds to Step S1345 where the port number of the currently-video-displaying port is updated. At Step S1350, this operation ends.

Illustrated in FIG. 13 is an operation to be performed when an input device is newly connected to a port and a video signal is input to the port. However, there can be a case where a user unintentionally touches and withdraws a cable that connects an input device to a port, causing the input device to be disconnected. There can also be a case where a user intentionally withdraws the cable to disconnect the input device or a case where video signal supply from the input device is stopped. An operation to be performed in these cases is described with reference to FIG. 14. When a change that a video signal is not input to the port any more occurs, an interrupt occurs. The video-capture-device driver 410 handles this interrupt.

The operation starts from Step S1400. At Step S1405, the signal detector 420 receives a notification from the video-capture-device driver 410 that no video signal is input. At this time, a port number of a port to which a video signal is not input any more is acquired. At Step S1410, a connection status of a flag associated with the port number is changed from ON to OFF. Examples of the flag are shown in FIG. 6. This action corresponds to Step S730 in the flowchart illustrated in FIG. 7.

At Step S1415, because the signal detector 420 has received the notification that no video signal is input to the port, the signal detector 420 determines whether an input device supplying a video signal of a currently-displayed video is connected to the port. More specifically, the signal detector 420 compares the port number of the port and the port number of the currently-video-displaying port. When the port numbers are identical, the video signal of the currently-displayed video cannot be supplied any more. Accordingly, at Step S1420, the signal detector 420 instructs the reproduction control unit 430 to acquire image data that is transferred by the DMA transfer unit 340 to the memory 200 immediately before when the reproduction control unit 430 stops DMA transfer. The reproduction control unit 430 instructs the sample acquiring unit 440 to acquire the image data. Accordingly, the sample acquiring unit 440 acquires the image data. At Step S1425, the reproduction control unit 430 transmits the acquired image data to the rendering unit 450, instructs the rendering unit 450 to render an image, and causes the image to be displayed on the display screen of the display apparatus 110. When the image is displayed, the operation ends at Step S1430.

On the other hand, when the port numbers differ from each other, it is suggested that the input device that is supplying the video signal of the currently-displayed video is connected to another port and capable of supplying the video signal. Therefore, supply of the video signal can be continued. Accordingly, control directly proceeds to Step S1430 where this operation ends.

The configurations of the display control apparatuses according to the two embodiments and operations to be performed thereby have been described in detail. However, the display control apparatus is not limited to these embodiments.

Figure 15A:
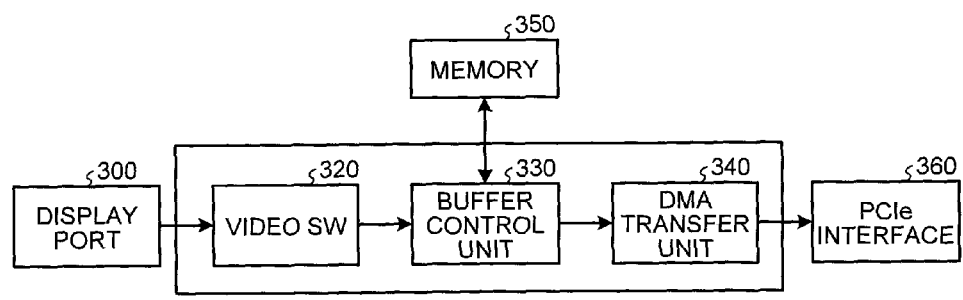
FIGS. 15A and 15B are diagrams illustrating another exemplary hardware structure of the video capture device.
Figure 15B:
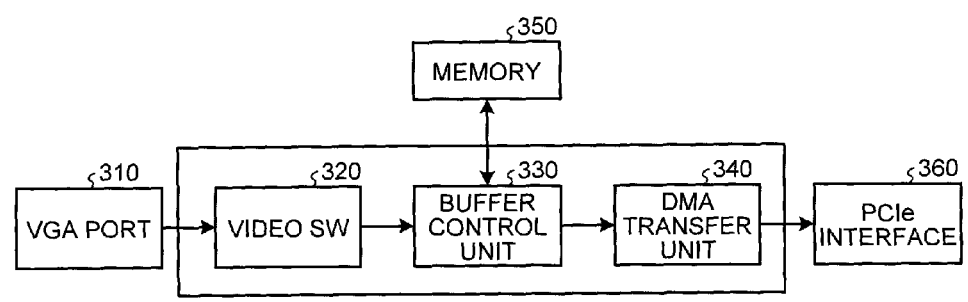

For example, the controller 130 does not necessary have the configuration illustrated in FIG. 3 in which the controller 130 includes the video capture device 240 having a plurality of ports. Alternatively, the controller 130 can have a configuration illustrated in FIGS. 15A and 15B in which the controller 130 includes a plurality of video capture devices each including one port, control units, a memory, and a PCIe interface.

If this alternative configuration is employed, device identification information such as a device number for identifying each of the video capture devices in lieu of a port number is to be used. FIG. 16 illustrates an example table of the flags associated with device numbers. Referring to the table, a flag is associated with a device number, "ON" or "OFF" indicating the connection status, and time stamp that indicates date and time when connection is made.

Any device that includes the hardware illustrated in FIG. 2 can be used as the controller 130. The controller 130 can be a PC, a server, a work station, or the like. The display control operations to be performed by the controller 130 can be implemented as and in a program such as an application and an OS. The method according to the embodiments described above can also be provided as a program. The program can be provided as being stored in a recording medium such as a CD-ROM or an SD card, or, alternatively, provided in a form of downloading from a server or the like in which the program is stored.

Each of the display control apparatus, the display control method, and the program enables, even when disconnection of an input device should occur, to automatically display an image captured in advance without performing manual switching. Accordingly, even when the input device is disconnected before a note or a snapshot is taken, the image is automatically displayed, allowing a user to take a note and/or a snapshot. Furthermore, when a user desires to add handwriting, handwriting can be added to the image.

When a video signal is input from a newly-connected input device, switching and displaying are performed automatically. Accordingly, a video of the video signal input from the newly-connected input device can be displayed without involving an operation by a user. The video that is newly input is a video to be viewed by a user of the image display system with highest priority. Therefore, by displaying the newly-input video as described above, a display scheme desirable for the user can be implemented. Furthermore, even if an interactive whiteboard application is not installed on the input device, when the image display system is provided with the functions and the program described above, a displayed video or a displayed image can be automatically switched to a composite image created by superimposing handwriting on the video or the image. By virtue of these, a situation that an operation related to display control hinders progress of a conference or the like can be prevented.

According to the embodiments, a display control apparatus that is connectable to a plurality of input devices, receives an input of a video signal from one input device of the plurality of devices, and performs control that causes a video to be displayed on the display apparatus is provided. This apparatus includes a capturing unit that captures image data representing a frame image of the input video signal; a signal detector that detects whether the video signal is input, and issues an instruction to cause the display apparatus to display the video or the frame image on the basis of a result of the detection; and a control unit that, when receiving the instruction to cause the display apparatus to display the frame image, generates the frame image from image data captured by the capturing unit most recently and causes the display apparatus to display the frame image.

When the signal detector detects that another input device is newly connected to the display control apparatus and a video signal is input from the another input device, the signal detector preferably instructs the control unit to cause the display apparatus to display a video generated from the video signal input from the another input device. When the signal detector detects that the video signal is not input from the one input device but a video signal is input from another input device, the signal detector preferably instructs the control unit to cause the display apparatus to display a video generated from the video signal input from the another input device.

The signal detector preferably includes any one of a detector that detects whether the video signal is input at fixed time intervals and a detector that detects a change in the presence or absence of an input of the video signal. This makes it possible to switch a currently-displayed video to another video or an image according to a result of the detection performed at the fixed time intervals as to whether a video signal is input or at occurrence of such a change that the video signal that has been input becomes absent, thereby preventing a screen of the display apparatus from going blank.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A display control apparatus connectable to a plurality of input devices, receiving an input of a video signal from one of the plurality of input devices, and causing a video to be displayed on a display apparatus, the display control apparatus comprising:
   a capturing unit configured to capture image data that represents a frame image of the input video signal;
   a signal detector configured to detect whether the video signal is input, and issue an instruction to cause the display apparatus to display the video or the frame image on the basis of a result of the detection;
   a controller configured to generate the frame image from the image data captured by the capturing unit most recently to cause the display apparatus to display the generated frame image when it is detected that the video signal is not input and the controller receives the instruction to cause the display apparatus to display the frame image; and
   a unit configured to acquire information input from a display screen of the display apparatus, and generate input image data from the acquired information,
   wherein the controller creates a composite image by overlaying an input image generated from the input image data on the frame image, and causes the display apparatus to display the composite image.

2. The display control apparatus according to claim 1, wherein when the signal detector detects that another input device is newly connected to the display control apparatus and a video signal is input from the another input device, the signal detector instructs the controller to cause the display apparatus to display a video generated from the video signal input from the another input device.

3. The display control apparatus according to claim 1, wherein when the signal detector detects that the video signal is not input from the one input device but a video signal is input from another input device, the signal detector instructs the controller to cause the display apparatus to display a video generated from the video signal input from the another input device.

4. The display control apparatus according to claim 1, wherein the signal detector includes a unit configured to detect whether the video signal is input at fixed time intervals or a unit configured to detect a change in presence or absence of an input of the video signal.

5. The display control apparatus according to claim 1, wherein
   the capturing unit includes a unit configured to capture the image data representing the frame image of the video signal and a unit configured to transfer the acquired image data, and
   the controller includes a unit configured to receive the transferred image data, and perform rendering according to the image data, thereby causing the video or the frame image to be displayed on a display screen of the display apparatus.

6. An image display system comprising:
   the display control apparatus according to claim 1;
   the display apparatus; and
   at least one of the plurality of input devices.

7. A display control method to be performed by a display control apparatus that is connectable to a plurality of input devices, receives an input of a video signal from one of the plurality of input devices, and causes a video to be displayed on a display apparatus, the display control method comprising:
   capturing image data representing frame images of the input video signal successively;
   detecting whether the video signal is input;
   issuing an instruction to cause the display apparatus to display the video or one of the frame images on the basis of a result of the detecting;
   generating successive frame images from the image data successively captured and displaying the successive frame images on the display apparatus when it is detected that the video signal is input and the instruction to cause the display apparatus to display the video is received;
   generating another frame image from the image data captured most recently by the capturing and displaying of the generated frame image on the display apparatus when it is detected that the video signal is not input and the instruction to cause the display apparatus to display the frame image is received;

acquiring information input from a display screen of the display apparatus, and generating input image data from the acquired information; and creating a composite image by overlaying an input image generated from the input image data on the another frame image, and causing the display apparatus to display the composite image.

8. A computer-readable recording medium with an executable program stored thereon, wherein the program instructs a computer to perform the display control method according to claim 7.

* * * * *